W. S. DOE.
BATTERY CONNECTOR.
APPLICATION FILED OCT. 25, 1919.
1,393,674.
Patented Oct. 11, 1921.
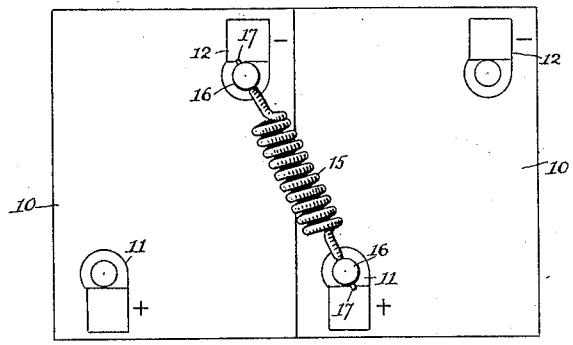
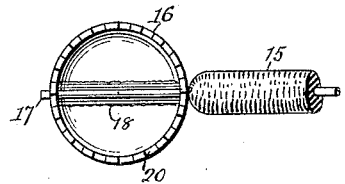 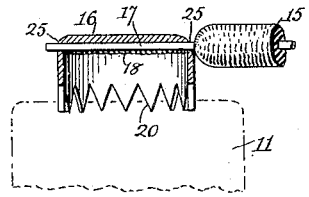
WITNESSES
INVENTOR.
Walter Scott Doe
BY
ATTORNEYS

UNITED STATES PATENT OFFICE.

WALTER SCOTT DOE, OF KENT, OHIO.

BATTERY-CONNECTOR.

1,393,674. Specification of Letters Patent. Patented Oct. 11, 1921.

Application filed October 25, 1919. Serial No. 333,142.

*To all whom it may concern:*

Be it known that I, WALTER SCOTT DOE, a citizen of the United States, and a resident of Kent, in the county of Portage and State of Ohio, have invented a new and Improved Battery-Connector, of which the following is a full, clear, and exact description.

The object of the invention is to provide a new and improved battery connector more especially designed for effectively connecting storage batteries in series or multiple when charging the same.

Another object is to provide a battery connector of simple and durable construction and one which is non-corrosive and acid-proof, not liable to get out of order, and capable of being used over and over again.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1 is a plan view of the improved battery connector as applied to two cells of a storage battery for temporarily connecting the cells with each other;

Fig. 2 is an enlarged inverted plan view of one end of the battery connector; and Fig. 3 is a sectional side elevation of the same.

Each of the cells 10 of the storage battery is provided with positive and negative terminals 11 and 12, made of lead or other suitable soft material. The positive and negative terminals 11 and 12 of adjacent cells are temporarily connected with each other for charging purposes by a connector comprising a conductor 15 and two attaching members 16 at the ends of the conductor. The conductor 15 is in the form of a coil of insulated wire having its bare terminals 17 fastened by solder or other fastening means 18 to corresponding attaching members 16. Each of the attaching members 16 is preferably in the form of a cup-shaped shell provided at its edge with teeth 20 adapted to be driven into the corresponding soft metal terminal 11 or 12 with a view to establish proper electrical connection between the positive and negative terminals of adjacent cells. Each of the attaching members 16 is made of sheet steel or other suitable hard metal to permit of readily driving the attaching member into position on the corresponding terminal by the blow of a hammer. Each of the attaching members is preferably coated with an acid-proof, non-corrodible material, and the coatings of the two attaching members are preferably of distinguishing colors, say one red and the other blue, to permit of making it easy to test the cells after poling them once, and applying say the red attaching member to the positive pole.

In practice, each cup-shaped shell is provided at diametrically opposite points with apertures 25 arranged adjacent to the top of the shell and through the apertures 25 is passed the bare end 17 of the conductor 15 to be then soldered to the under side of the top on the attaching member, to insure an exceedingly good contact between the bare end 17 and the shell top.

From the foregoing it will be seen that by the arrangement described, the attaching member 16 can be readily driven into the lead terminals of the cells to be connected with each other, and after the battery is charged the attaching members can be readily disconnected by slight blows of a hammer directed against the sides of the attaching members. The teeth 20 can be readily sharpened from time to time to permit of effectively re-using the connector.

The improved battery connector shown and described is very simple and durable in construction and not liable to get out of order easily.

Having thus described my invention, I claim as new and desire to secure by Letters Patent:—

1. A battery connector, comprising a tubular member formed at one end with teeth adapted to be driven into a lead terminal of a storage battery, said member being provided with means, whereby an electric conductor may be secured thereto.

2. A battery connector, comprising a shell having an end provided with means adapting it to be driven into a lead terminal of a storage battery, said shell being provided with registering apertures for securing an electric conductor thereto.

3. In a battery connector, a circular cup-shape toothed member adapted to be driven into the lead terminals of a storage battery and having means, whereby an electric conductor may be readily secured thereto.

4. A circular cup-shape toothed connector, the teeth on the open end of the cup to be pounded into the leaden poles of a storage battery, and having holes in the sides of the connector for the admission of the wire which is to be soldered thereto.

WALTER SCOTT DOE.